United States Patent
Cho

(10) Patent No.: US 7,021,117 B2
(45) Date of Patent: Apr. 4, 2006

(54) METHOD FOR DIAGNOSING A NOISY FAILURE OF A FUEL LEVEL SENSOR IN A VEHICLE

(75) Inventor: Joon Kwan Cho, Suwon (KR)

(73) Assignee: Hyundai Motor Company, Seoul (KR)

( * ) Notice: Subject to any disclaimer, the term of this patent is extended or adjusted under 35 U.S.C. 154(b) by 243 days.

(21) Appl. No.: 10/751,045

(22) Filed: Dec. 31, 2003

(65) Prior Publication Data

US 2005/0072206 A1 Apr. 7, 2005

(30) Foreign Application Priority Data

Oct. 1, 2003 (KR) .................. 10-2003-0068382

(51) Int. Cl.
*G01F 19/00* (2006.01)
*G01F 25/00* (2006.01)

(52) U.S. Cl. ..................................... 73/1.73

(58) Field of Classification Search ............. 73/1.73, 73/290 R, 291
See application file for complete search history.

(56) References Cited

U.S. PATENT DOCUMENTS 4,611,287 A 9/1986 Kobayashi et al. ......... 701/123
6,904,783 B1 * 6/2005 Elenich et al. ............... 73/1.73

FOREIGN PATENT DOCUMENTS

| EP | 1 310 776 A2 | 5/2003 |
| JP | 08147043 A | 6/1996 |
| JP | 2002-249588 | 9/2002 |

* cited by examiner

*Primary Examiner*—Hezron Williams
*Assistant Examiner*—Tamiko Bellamy
(74) *Attorney, Agent, or Firm*—Morgan Lewis & Bockius LLP

(57) ABSTRACT

When a predetermined diagnosis beginning condition is satisfied, a conversion value converted from a signal from a fuel level sensor is compared with a predetermined value, and a detection of a fluctuation is counted in accordance with the comparison. When a fluctuation detection duration exceeds a predetermined period and a fluctuation detection counter value exceeds a first predetermined number, a noisy failure occurrence is counted and a noisy failure of the fuel level sensor is warned of in the case that the noisy failure counter value exceeds the second predetermined number.

7 Claims, 2 Drawing Sheets

METHOD FOR DIAGNOSING A NOISY FAILURE OF A FUEL LEVEL SENSOR IN A VEHICLE

CROSS-REFERENCE TO RELATED APPLICATIONS

This application claims priority of Korean Application No. 10-2003-0068382, filed on Oct. 1, 2003, the disclosure of which is incorporated fully herein by reference.

FIELD OF THE INVENTION

The present invention relates generally to a method of diagnosing a noisy failure of a fuel level sensor in a vehicle.

BACKGROUND OF THE INVENTION

Recently, vehicles have been provided with various diagnosis functions, such as those provided in a self diagnosis system (e.g., an On-Board Diagnosis (OBD) system). An example of such a diagnosis function may be monitoring leakage of a fuel supply system. Usually, a vehicle is equipped with a fuel level sensor for detecting the amount of fuel stored in the fuel tank.

The above-mentioned fuel leakage monitoring may function depending on the operation of the fuel level sensor. For example, in the case where the difference between the value of the fuel level detected at the fuel level sensor, and the filtered value (e.g., a low-pass filtered value) is large, the fuel leakage monitoring function may be stopped.

When the difference between a raw detected value and its filtered value of the fuel level sensor is high, it may imply that a fluctuation of fuel in the fuel tank is large. In this case, the fuel leakage monitoring is stopped in order to prevent a wrong diagnosis.

According to such a prior art, the possibility of noise in the fuel level sensor is not considered. However, it is notable that there may be a big difference between the raw detected value and the filtered value in the case where the signal received from the fuel level sensor has a lot of noise.

That is, according to the prior art, when the fuel level sensor is in a noisy failure state, such a failure is not diagnosed nor is the fuel leakage monitoring function performed.

Therefore, if a method for diagnosing noisy failure of a fuel level sensor of a vehicle is provided, the self diagnosis function of the vehicle and the fuel leakage monitoring function may be enhanced.

SUMMARY OF THE INVENTION

An exemplary method for diagnosing a noisy failure of a fuel level sensor in a vehicle according to an embodiment of the present invention includes: determining if a predetermined diagnosis beginning condition is satisfied; comparing, when the diagnosis beginning condition is satisfied, a conversion voltage with a predetermined voltage, the conversion voltage being converted from a signal from the fuel level sensor; counting a number of detections of a fluctuation in accordance with the comparison of the conversion voltage with the predetermined voltage; comparing a fluctuation detection duration with a predetermined period; comparing, when the fluctuation detection duration exceeds the predetermined period, a fluctuation detection counter value with a first predetermined number; counting a noisy failure when the fluctuation detection counter value exceeds the first predetermined number; comparing a noisy failure counter value with a second predetermined number; and warning of a noisy failure when the noisy failure counter value exceeds the second predetermined number.

In a further embodiment, an exemplary method according to an embodiment of the present invention further includes: resetting the noisy failure counter before the determining if the predetermined diagnosis beginning condition is satisfied; and resetting the fluctuation detection counter before the determining if the predetermined diagnosis beginning condition is satisfied.

In another further embodiment, the diagnosis beginning condition includes an engine running state condition, a vehicle running state condition, an idle switch condition, and an engine speed condition, wherein: the engine running state condition is set as whether the engine is not stalled or in a starting state; the vehicle running state condition is set as whether the vehicle is stationary; the idle switch condition is set as whether an idle switch is turned on; and the engine speed condition is set as whether the engine speed is less than a predetermined speed.

In a still further embodiment, the diagnosis beginning condition further includes a fuel stabilization condition that is set as whether a predetermined time period has elapsed after the engine running state condition, the vehicle running state condition, the idle switch condition, and the engine speed condition are all satisfied.

In a yet further embodiment, the conversion voltage is calculated as an absolute value of a difference between a raw detected value and a filtered value of the fuel level sensor.

In a yet further embodiment, the counting a number of detection times of a fluctuation increases the fluctuation detection counter value by one (1).

In a yet further embodiment, the resetting of the fluctuation detection counter is executed when the diagnosis beginning condition is not satisfied in the determining if the predetermined diagnosis beginning condition is satisfied.

BRIEF DESCRIPTION OF THE DRAWINGS

The accompanying drawings, which are incorporated in and constitute a part of the specification, illustrate an embodiment of the invention, and, together with the description, serve to explain the principles of the invention, wherein.

DETAILED DESCRIPTION OF THE PREFERRED EMBODIMENTS

Figure 1:
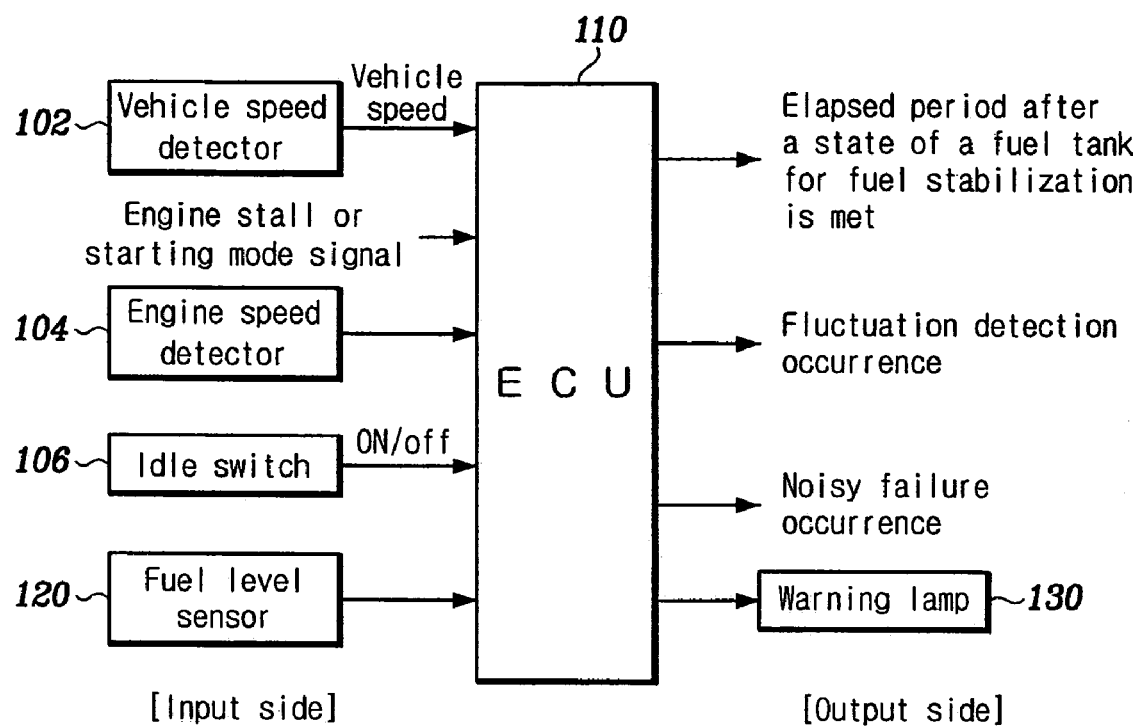
FIG. 1 is a block diagram of an apparatus for diagnosing a noisy failure of a fuel level sensor of a vehicle according to an illustrative embodiment of the present invention.

An embodiment of the present invention will hereinafter be described in detail with reference to the accompanying drawings. Referring to FIG. 1, an apparatus for diagnosing a noisy failure of a fuel level sensor 120 in a vehicle, according to an embodiment of the present invention, includes a vehicle speed detector 102, an engine speed detector 104, an idle switch 106 for detecting closing of a throttle valve of an engine, and an electronic control unit (ECU) 110 for diagnosing a noisy failure of the fuel level sensor 120 on the basis of signals from the detectors 102, 104 and switch 106. The ECU 110 receives a vehicle speed signal from the vehicle speed detector 102, an engine speed signal from the engine speed detector 104, and an idle on/off signal from the idle switch 106.

FIG. 1 illustrates that the ECU 110 also receives a signal related to an engine stall or an engine starting state, and this illustration is for better understanding of a function of the ECU 110. In more detail, regarding the signal related to an engine stall or an engine starting state, the ECU 110 itself may determine, on the basis of the engine speed signal, if the engine is stalled or starting. Or, such a signal related to the engine stall or starting state may be input to the ECU 110 by an additional sensor (not shown).

In addition, according to an embodiment of the present invention, the ECU 110 calculates an elapsed period after fuel stabilization of the fuel tank is reached, counts a number of fluctuations of signals from the fuel level sensor 120, and counts a number of noisy failures of the fuel level sensor 120 that are temporarily detected.

The ECU can be realized by one or more processors activated by a predetermined program, and the predetermined program can be programmed to perform each step of a method according to an embodiment of this invention.

Figure 2:
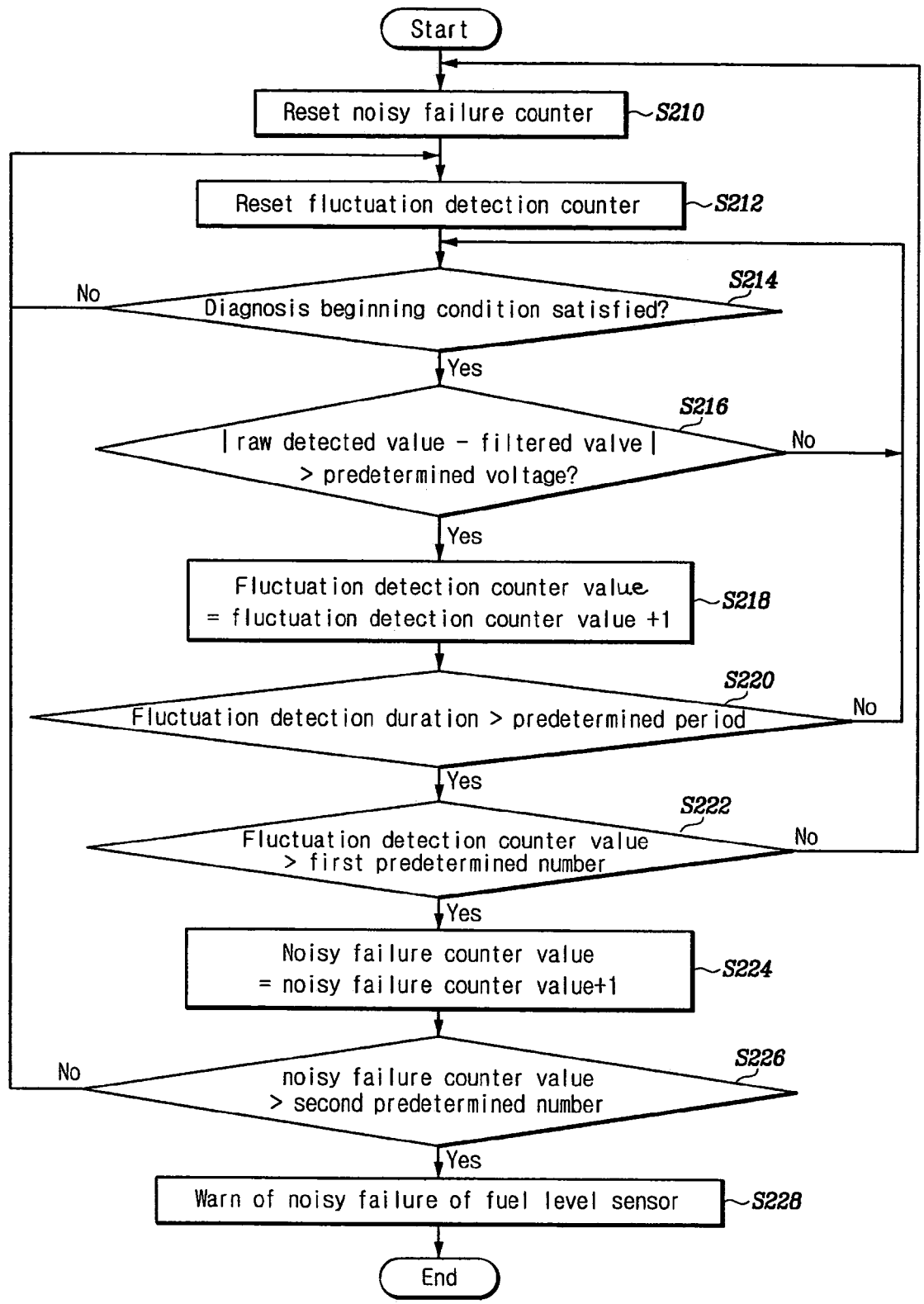
FIG. 2 is a flowchart showing a method for diagnosing a noisy failure of a fuel level sensor of a vehicle according to an illustrative embodiment of the present invention.

FIG. 2 is a flowchart showing a method for diagnosing a noisy failure of a fuel level sensor of a vehicle according to an embodiment of the present invention.

Referring to FIG. 2, the ECU 110 first resets a noisy failure counter to zero (0) at step S210 and subsequently resets a fluctuation detection counter to zero (0) at step S212. Subsequently at step S214, the ECU 110 determines if a predetermined diagnosis beginning condition is satisfied. The diagnosis beginning condition includes a condition for an engine running state, a condition for a vehicle running state, a condition for the idle switch 106, and a condition for the engine speed.

In more detail, the condition for the engine running state is set as whether the engine is not stalled or in a starting state, the condition for the vehicle running state is set as whether the vehicle is stationary, the condition for the idle switch 106 is set as whether the engine is in an idle state (i.e., the idle switch 106 is turned on), and the condition for the engine speed is set as whether the engine speed is less than a predetermined speed.

In addition, the diagnosis beginning condition further includes a fuel stabilization condition. The fuel stabilization condition is set as whether a predetermined period has elapsed after the conditions (the engine running state condition, the vehicle running state condition, the idle switch condition, and the engine speed condition) are all satisfied.

It is notable that the conditions (the engine running state condition, the vehicle running state condition, the idle switch condition, and the engine speed condition) are set as conditions for fuel in the fuel tank to be expected not to fluctuate. However, the last condition is added because the fuel in the fuel tank is expected to be sufficiently stabilized (i.e., fluctuation is sufficiently reduced) only after at least some period has passed after the above mentioned conditions are met.

The above described conditions may be summarized as follows.

(1) An engine is not stalled or in a starting state;

(2) The vehicle is stationary (e.g., vehicle speed<1.25 Km/H);

(3) The idle switch is turned on;

(4) Engine speed<Predetermined speed (e.g., 900 rpm); and (5) A predetermined period should have passed after the conditions 1 to 4 were met.

If the diagnosis beginning condition is not satisfied at the step S214, the ECU 110 resets the fluctuation detection counter again (S214-no).

If the diagnosis beginning condition is satisfied at the step S214, the ECU 110 compares a conversion voltage with a predetermined voltage at step S216. The conversion voltage is converted from the signal of the fuel level sensor 120. In more detail, the conversion voltage is calculated as an absolute value of the difference between a raw detected value and a filtered value of the fuel level sensor 120. That is, the conversion voltage is calculated as conversion voltage=|raw detected value−filtered value|. The predetermined voltage is set, e.g., as 0.41V.

When the conversion voltage is greater than the predetermined voltage at step S216, the ECU 110 counts it as a detection of a fluctuation at step S218. In more detail, at the step S218, the ECU 110 increases the fluctuation detection counter value by one (1).

Then at step S220, the ECU 110 compares a fluctuation detection duration with a predetermined period. The fluctuation detection duration is defined as a duration during which the fluctuation is detected. The predetermined period is a criterion for determining if the fuel level sensor 120 is possibly in a noisy failure state. According to an embodiment of the present invention, the predetermined period is set as, e.g., 5 seconds.

When the fluctuation detection duration exceeds the predetermined period at the step S220, the ECU 110 compares the fluctuation detection counter value with a first predetermined number at step S222.

According to an embodiment of the present invention, the first predetermined number is set as 250. The first predetermined number may be altered by a person of ordinary skill in the art in accordance with a design factor. For example, the first predetermined number may be set as a number that registers when a malfunction of the fuel level sensor 120 occurs when the fuel level sensor 120 is short-circuited by applying an ignition coil signal thereto in order to intentionally form a failure of the fuel level sensor 120.

When the fluctuation detection counter value exceeds the first predetermined number at the step S222, the ECU 110 counts it as a noisy failure at step S224. In more detail, at the step S224, the ECU 110 increases the noisy failure counter value by one (1).

Then at step S226, the ECU 110 compares the noisy failure counter value with a second predetermined number (e.g., 5) at step S226. When the noisy failure counter value exceeds the second predetermined number at the step S226, the ECU 110 warns of a noisy failure at step S228. In more detail, at the step S228, the ECU 110 turns on the warning lamp 130.

According to the above described process S210 to S226, when a difference between a raw detected value and a filtered value of a fuel level sensor exceeds the predetermined level (refer to the predetermined voltage) for a long period (refer to the predetermined period and the second predetermined number) while a condition for stabilization of fuel in the fuel tank (refer to the diagnosis beginning condition) is satisfied, the fuel level sensor is diagnosed to be in a noisy failure state.

The above described processes S210 to S226 are recursively executed in 10 msec.

According to an embodiment of the present invention, a noisy failure of a fuel level sensor can be diagnosed, and thereby a self diagnosis function of a vehicle is enhanced.

While this invention has been described in connection with what is presently considered to be the most practical and preferred embodiment, it is to be understood that the invention is not limited to the disclosed embodiments. Rather, the present invention is intended to cover various modifications and equivalent arrangements included within the spirit and scope of the appended claims.

What is claimed is:

1. A method for diagnosing a noisy failure of a fuel level sensor in a vehicle, comprising:
   determining if a predetermined diagnosis beginning condition is satisfied;
   comparing, when the diagnosis beginning condition is satisfied, a conversion voltage with a predetermined voltage, the conversion voltage being converted from a signal from the fuel level sensor;
   counting a number of detections of a fluctuation in accordance with the comparison of the conversion voltage with the predetermined voltage;
   comparing a fluctuation detection duration with a predetermined period;
   comparing, when the fluctuation detection duration exceeds the predetermined period, a fluctuation detection counter value with a first predetermined number;
   counting a noisy failure when the fluctuation detection counter exceeds the first predetermined number;
   comparing a noisy failure counter value with a second predetermined number; and
   warning of a noisy failure when the noisy failure counter value exceeds the second predetermined number.

2. The method of claim 1, further comprising:
   resetting the noisy failure counter before determining if the predetermined diagnosis beginning condition is satisfied; and
   resetting the fluctuation detection counter before determining if the predetermined diagnosis beginning condition is satisfied.

3. The method of claim 1, wherein the diagnosis beginning condition comprises an engine running state condition, a vehicle running state condition, an idle switch condition, and an engine speed condition, wherein:
   the engine running state condition is set as whether the engine is not stalled or in a starting state;
   the vehicle running state condition is set as whether the vehicle is stationary;
   the idle switch condition is set as whether an idle switch is turned on; and
   the engine speed condition is set as whether the engine speed is less than a predetermined speed.

4. The method of claim 3, wherein the diagnosis beginning condition further comprises a fuel stabilization condition that is set as whether a predetermined elapsing period has been elapsed after the engine running state condition, the vehicle running state condition, the idle switch condition, and the engine speed condition are all satisfied.

5. The method of claim 1, wherein the conversion voltage is calculated as an absolute value of a difference between a raw detected value and a filtered value of the fuel level sensor.

6. The method of claim 1, wherein counting a detection of a fluctuation increases the fluctuation detection counter value by one (1).

7. The method of claim 2, wherein the resetting the fluctuation detection counter is executed when the diagnosis beginning condition is not satisfied in determining if the predetermined diagnosis beginning condition is satisfied.

* * * * *